_United States Patent Office_

3,158,610
Patented Nov. 24, 1964

3,158,610
2-STYRYLBENZOXAZOLE BRIGHTENERS
Bennett George Buell, Somerville, N.J., assignor to American Cyanamid Company, Stamford, Conn., a corporation of Maine
No Drawing. Filed Jan. 3, 1964, Ser. No. 335,679
8 Claims. (Cl. 260—240)

This application is a continuation-in-part of Serial No. 153,196, filed November 17, 1961.

This invention relates to the provision of new and useful organic compounds. More particularly, this invention relates to the provision of a new class of fluorescent substituted 2-styrylbenzoxazole compounds which are useful inter alia for "invisible" marking and as brightening agents for polymeric organic materials such as natural and synthetic fibers, resin masses (e.g. polyolefins such as polyethylene; and vinylchloride polymers such as polyvinylchloride) and lacquers; and to the preparation of said compounds by a process which involves the provision of new intermediates.

The compounds of the present invention are represented by the following formula:

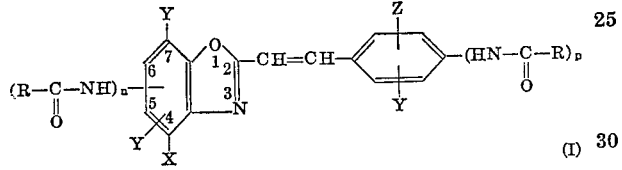

(I)

wherein the R radicals are individually hydrogen, an alkyl radical of up to seventeen carbons (e.g., methyl, ethyl, propyl, butyl, cyclohexyl and heptadecyl, including their mono- and di-chlorinated, hydroxylated and lower alkoxylated analogs such as chloromethyl, hydroxymethyl, hydroxyethyl, α,β-dihydroxyethyl, and β-ethoxyethyl), an aryl radical of less than three 6-membered rings (e.g., phenyl, biphenyl and napthyl, as well as halo, alkyl up to eighteen carbons, alkoxy of up to eighteen carbons, hydroxy, carboxy, cyano, di-lower alkylamino, lower alkanamido, lower alkylthio, lower alkylsulfonyl, carbamoyl or sulfamoyl substituted analogs thereof), aralkyl (e.g., benzyl and phenethyl), amino, mono-lower alkylamino, di-lower alkylamino, arylamino or lower alkoxy; each Y radical is either hydrogen, lower alkoxy, halogen or lower alkyl; and $n$ and $p$ are integers each less than two such that their sum is a positive integer less than three. The terms "lower alkyl" and "lower alkoxy" and the like are used in their conventional sense to designate cyclic, straight or branched chain moieties having from one to seven carbon atoms.

Fluorescent compounds which are essentially colorless have been used for many purposes. Thus they have been employed for "invisibly" marking a variety of materials. Marked materials are not visibly altered; however they can be readily identified by irradiation with ultraviolet light. Examples of such uses are marking inks for laundry, incorporation in plastics, oils, waxes, etc. By far the major use of fluorescent compounds has been for imparting a bleached i.e., a whiter or brighter, appearance to natural and synthetic polymeric materials which normally have a dull, yellowish tinge in the untreated state. Undoubtedly, this "optical bleaching" action is the result of an ability to convert certain ultraviolet components of incident daylight to visible blue components which complement and cancel the undesired tinge in the untreated material.

The compounds of this invention as represented by Formula I are fluorescent, and have affinity for, and solubility in a variety of materials. They can thus be used for invisible marking or optical brightening purposes as above described.

The compounds of this invention may be prepared by a new process which involves the formation of new chemical intermediates and is represented in the following flow sheet wherein $n$, $p$, R and Y are as hereinbefore defined, X is either hydrogen or nitro, at least one being nitro, and X' is either amino or hydrogen depending on the value of X in the unreduced precursor.

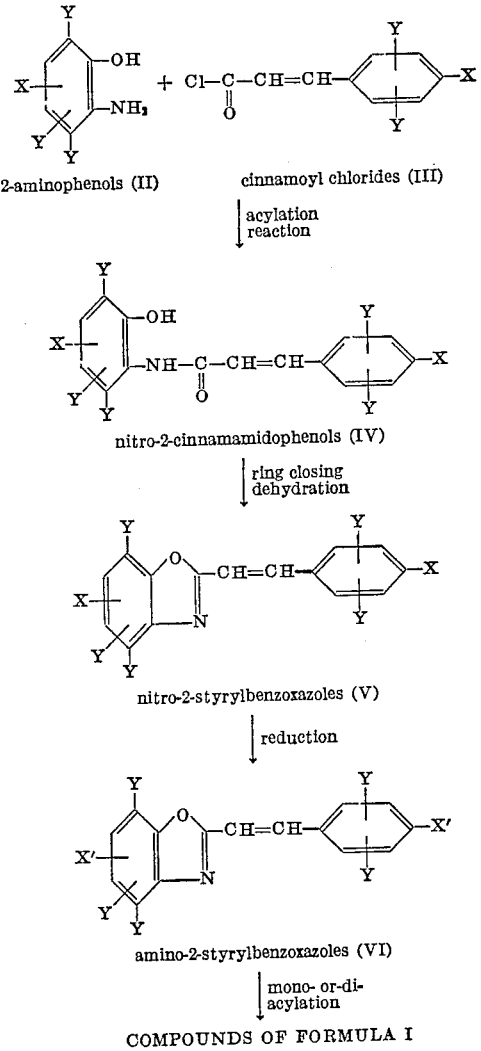

COMPOUNDS OF FORMULA I

The reaction of the aminophenol and the cinnamoyl halide to give the nitro cinnamamidophenols of Formula IV is preferably conducted in the presence of an organic base as solvent and acid acceptor (e.g., pyridine, triethylamine and dimethylaniline) at elevated temperature. While the above reaction has been illustrated with an acyl chloride, the acyl bromide can be used, although the former is preferred for its convenience and availability. Since the ultimate compounds of this invention may have an amido group on the benzo moiety of the heterocyclic and/or the phenyl radical of the styryl moiety, the foregoing reaction may employ aminophenols and cinnamoyl chlorides with or without nitro radicals provided that at least one reactant has a nitro group.

The list of suitable phenols includes inter alia:

2-aminophenol
3-chloro-2-aminophenol
4-chloro-2-aminophenol
5-chloro-2-aminophenol
6-chloro-2-aminophenol
3-bromo-2-aminophenol
3-fluoro-2-aminophenol
3,6-dichloro-2-aminophenol
4,6-dichloro-2-aminophenol
3-bromo-6-chloro-2-aminophenol
3-methyl-2-aminophenol
4-methyl-2-aminophenol
4-ethyl-2-aminophenol
4,6-dimethyl-2-aminophenol
6-chloro-3-methyl-2-aminophenol
6-chloro-4-methyl-2-aminophenol
3-chloro-6-methyl-2-aminophenol
3-bromo-6-methyl-2-aminophenol
4-methoxy-2-aminophenol
5-ethoxy-2-aminophenol
4-methoxy-6-chloro-2-aminophenol
6-methoxy-4-methyl-2-aminophenol
4-nitro-2-aminophenol
5-nitro-2-aminophenol
5-nitro-4-methyl-2-aminophenol
4-nitro-6-methyl-2-aminophenol
5-nitro-3-methyl-2-aminophenol
5-nitro-3-ethyl-2-aminophenol
5-nitro-4-ethyl-2-aminophenol
4-nitro-6-chloro-2-aminophenol
5-nitro-3-chloro-2-aminophenol
5-nitro-4-chloro-2-aminophenol
5-nitro-4,6-dichloro-2-aminophenol
4-nitro-3-chloro-6-methyl-2-aminophenol
5-nitro-4-methoxy-2-aminophenol
4-nitro-6-methoxy-2-aminophenol The list of suitable cinnamoyl halides includes inter alia:

Cinnamoyl chloride
Cinnamoyl bromide
2, 3- or 4-methylcinnamoyl chloride
3-ethylcinnamoyl chloride
4-isopropylcinnamoyl chloride
2-n-butylcinnamoyl chloride
2-hexylcinnamoyl chloride
2, 3- or 4-methoxycinnamoyl chloride
3-methoxy-4-chlorocinnamoyl chloride
6-methoxy-4-methylcinnamoyl chloride
4-nitrocinnamoyl chloride
4-nitrocinnamoyl bromide
2, 3- 4-methoxycinnamoyl chloride
2, 3- or 4-chlorocinnamoyl chloride
2, 3- or 4-bromocinnamoyl chloride
3,5-dichlorocinnamoyl chloride
2-methyl-4-chlorocinnamoyl chloride
2-methyl-4-nitrocinnamoyl chloride
3-methyl-4-nitrocinnamoyl chloride
3-chloro-4-nitrocinnamoyl chloride
3,5-dichloro-4-nitrocinnamoyl chloride
2-methyl-5-chloro-4-nitrocinnamoyl chloride
2-methoxy-4-nitrocinnamoyl chloride
3-methoxy-6-chloro-4-nitrocinnamoyl chloride The nitro-2-cinnamamidophenols of Formula IV prepared by the foregoing reaction are ring-closed by a conventional dehydration reaction to yield the corresponding nitro-2-styrylbenzoxazoles of Formula V. Such dehydration may be effected by fusion in a non-aqueous medium such as boric acid at a temperature above 170° C., but below decomposition, i.e., 275° C.

The resulting nitro-2-styrylbenzoxazoles of Formula V are reduced to their amino analogs of Formula VI by treatment with conventional reducing agents such as inorganic sulfides, e.g., hydrogen sulfide, sodium sulfide and sodium hydrosulfide, in an organic solvent such as a lower alkanol.

The compounds of Formula I are obtained by acylation of the free amino groups of the compounds of Formula VI. The acylation is conducted along conventional lines using either an alkanoic acid halide or anhydride; an arylcarboxylic acid halide or anhydride; an isocyanate; or a chloroformic ester used alone or followed with a primary or secondary amine.

Suitable aliphatic acylating agents are inter alia:

Acetyl chloride
Acetyl bromide
Acetic anhydride
Propionyl chloride
Propionic anhydride
Butyryl chloride
Butyric anhydride
Isobutyryl chloride
Valeryl chloride
Trimethylacetyl chloride
Octanoyl chloride
Octadecanoyl chloride
Chloroacetyl chloride
Bromoacetyl bromide
α and β-Choloropropionyl chloride
Dichloroacetyl chloride
Trifluoroacetyl chloride
Glycolic anhydride
Lactic anhydride
Glyceric acid anhydride
Methoxyacetyl chloride Suitable aralkyl acylating agents are inter alia:

Phenacetyl chloride and β-phenylpropionyl chloride.

Suitable aryl acylating agents are inter alia:

Benzoyl halides
o, m, or p-Toluoyl halides
2,4-dimethylbenzoyl halides
o, m or p-Anisoyl halides
o, m or p-Ethexybenzoyl halides
2,4-dimethoxybenzoyl halides
3,4,5-trimethoxybenzoyl halides
o, m or p-Chlorobenzoyl halides
o, m or p-Bromobenzoyl halides
2,4-dichlorobenzoyl halides
5-chloro-2-methylbenzoyl halides
4-chloro-3-methoxybenzoyl halides
o, m or p-Hydroxybenzoyl halides
2-hydroxy-3-methylbenzoyl halides
4-ethoxy-2-hydroxybenzoyl halides
o, m or p-Dimethylaminobenzoyl halides
o, m or p-Methylmercaptobenzoyl halides
o, m or p-Methylsulfonylbenzoyl halides
o, m or p-Carbamoylbenzoyl halides
o, m or p-N-methylcarbamoylbenzoyl halides
o, m or p-Sulfamoylbenzoyl halides
o, m or p-N-methylsulfamoylbenzoyl halides
o, m or p-N-N-dimethylsulfamoylbenzoyl halides
p-Phenylbenzoyl halides
1 or 2-naphthoyl halides
3-hydroxy-2-naphthoyl halides
4-methoxy-1-naphthoyl halides
6-chloro-2-naphthoyl halides
4-methylsulfonyl-1-naphthoyl halides
6-acetamido-2-naphthoyl halides Suitable alkoxycarbonylating agents are methyl and ethyl chloroformate.

Suitable carbamoylating agents are potassium cyanate, phenyl isocyanate, o, m or p-alkoxyphenyl isocyanate, o, m, or p-lower alkylphenyl isocyanates, o, m or p-chlorophenyl isocyanate, 1- or 2-naphthyl isocyanate and the like. Alternatively the compounds of Formula VI may be carbamoylated by stepwise treatment with ethyl chloroformate and either ammonia, a primary or secondary aryl amine or a primary or secondary alkylamine such as methylamine, dimethylamine, ethylamine, aniline, N-methylaniline, m-toluidine, p-chloroaniline and the like.

This invention is further illustrated by the following examples in which parts are on a weight basis.

EXAMPLE 1

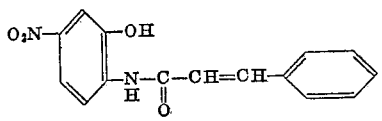

To a solution of 15.4 grams 2-amino-5-nitrophenol in 30 ml. of pyridine is added 16.7 grams of cinnamoyl chloride. The mixture is heated on a steam bath until the reaction is complete (½ hour), cooled and poured into an ice-water mixture. The product is isolated by filtration and dried at 55° C.

EXAMPLE 2

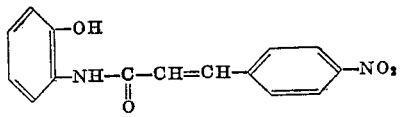

To a solution of 21 grams of 4-nitrocinnamoyl chloride in 50 ml. of pyridine is added 10.9 grams of o-aminophenol in 100 ml. of pyridine. The solution is heated at reflux for two hours, drowned in water and the product isolated by filtration and drying at 55° C.

EXAMPLE 3

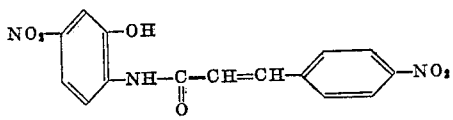

A mixture of 9.7 grams of 4-nitrocinnamic acid and 100 ml. of thionyl chloride is heated at reflux until the formation of the acid chloride is complete (2 hrs.). A clear solution results. The excess thionyl chloride is removed by vacuum distillation, benzene added and the distillation continued to remove traces of thionyl chloride and the benzene. The residue is dissolved in 50 ml. of pyridine and 7.2 grams of 5-nitro-2-aminophenol added. The mixture is heated at reflux until the reaction is complete (2 hrs.), and is drowned in an ice-water mixture. The amide is isolated by filtration and dried.

EXAMPLE 4

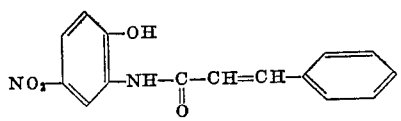

Heated on a steam bath are 22.5 grams of 2-amino-4-nitrophenol, 150 ml. of pyridine and 24.3 grams of cinnamoyl chloride. When the reaction is complete, the mixture is poured into ice water. The resultant product, 2-cinnamamido-4-nitrophenol is isolated by filtration, washed with water and dried at 55° C.

EXAMPLE 5

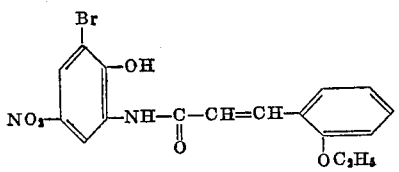

The above product is obtained by following the procedure of Example 3, with the substitution of equivalent amounts of 6-bromo-4-nitro-2-aminophenol for the 5-nitro-2-aminophenol, and 2-ethoxycinnamic acid for the 4-nitrocinnamic acid of that example.

EXAMPLE 6

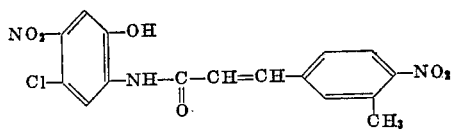

The above product is obtained by following the procedure of Example 3, with the substitution of equivalent amounts of 4-chloro-5-nitro-2-aminophenol for the 5-nitro-2-aminophenol, and of 3-methyl-4-nitrocinnamic acid for the 4-nitrocinnamic acid of that example.

EXAMPLE 7

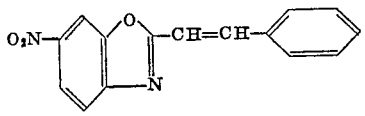

A mixture of 27.1 grams of 2-cinnamamido-5-nitrophenol and 6.2 grams of boric acid is fused at 240° C. until the reaction is complete. The fusion product is ground, taken up in hot methoxyethanol, treated with activated charcoal and filtered. The filtrate is cooled and the product precipitated by the addition of water. The product, 2-styryl-6-nitrobenzoxazole, is isolated by filtration, washed with water and dried at 55° C.

EXAMPLE 8

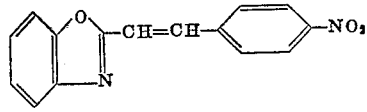

The amide of Example 2 is fused with 6 grams of boric acid at 235–240° C. for 15 minutes. The fusion product is dissolved in methoxyethanol, clarified with activated charcoal, filtered and reprecipitated by the addition of water to yield the product.

EXAMPLE 9

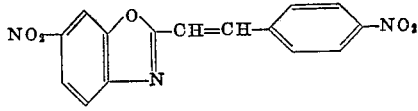

The above product is obtained by fusion of the compound of Example 3 in accordance with the procedure of Example 8.

EXAMPLE 10

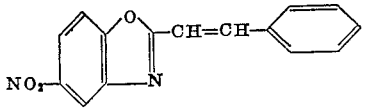

The above product is obtained by fusion of the amide of Example 4 in accordance with the procedure of Example 8.

EXAMPLE 11

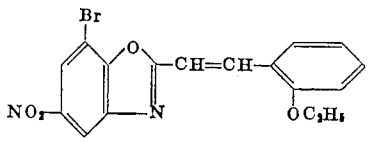

The above product is obtained by fusion of the amide of Example 5 in accordance with the procedure of Example 8.

EXAMPLE 12

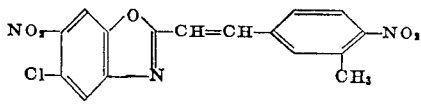

The above product is obtained by fusion of the product of Example 6 in accordance with the procedure of Example 8.

EXAMPLE 13

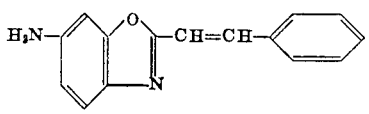

A slurry of 15.8 grams of the product of Example 7, 2-styryl-6-nitrobenzoxazole, in 125 ml. of ethanol is heated to the boil. A solution of 10 grams of sodium sulfhydrate in 40 ml. of water is added gradually (in 10 min.). The temperature is maintained until the reaction is complete (another 10 min.). The product is precipitated by the addition of water. It is then isolated by filtration, washed with water and dried at 55° C.

EXAMPLE 14

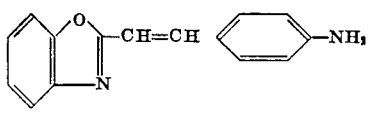

The nitrobenzoxazole of Example 8 is reduced in 500 ml. of alcohol at 80° C. by addition of 32 grams of sodium hydrosulfide in 200 ml. of water. When the reaction is complete, activated charcoal is added and the mixture filtered and then drowned. Filtration, washing and drying yields the isolated product.

EXAMPLE 15

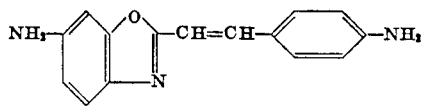

The nitrobenzoxazole of Example 9 is reduced by slurrying in 200 ml. of alcohol, and adding 16 grams of NaSH in 50 ml. of water and heating at reflux until the reaction is complete (1 hr.). The product is isolated by drowning on ice, filtration and drying.

EXAMPLE 16

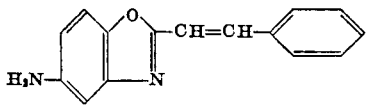

The product of Example 10 is slurried in 200 ml. of ethyl alcohol and heated to reflux. A solution of 17 grams of sodium hydrogen sulfide in 80 ml. of water is added and the reaction heated at reflux until reduction is complete. The solution is then treated with activated charcoal, filtered and the filtrate treated with water to precipitate the product. The 2-styryl-5-aminobenzoxazole product is isolated by filtration, washing with water and drying at 55° C.

EXAMPLE 17

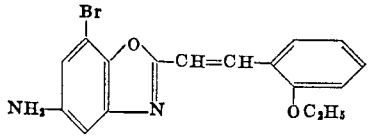

Following the reduction procedure of Example 13 the product of Example 11 is converted to the compound of the above formula.

EXAMPLE 18

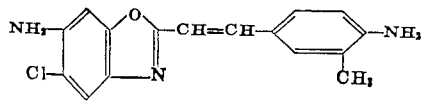

Following the reduction procedure of Example 13 the benzoxazole of Example 12 is converted to the compound of the above formula.

The following examples show the preparation of the final compounds of this invention from the intermediates obtained in the foregoing examples.

The evaluation of the compounds as brighteners is based in part on results of the following test procedures.

(A) *Method of Applying Brighteners to Cotton, Nylon and Acetate in the Presence of Detergent*

To 40 cc. of distilled water in a Launder-Ometer jar is added 10 cc. of a 0.005% concentration of the brightener product in water and 50 cc. of a 1.0% concentration of detergent in water. A wet-out five gram skein or piece of fabric comprising bleached cotton muslin 80 x 80, or resin treated cotton or scoured nylon tricot, is added. The jar is closed, shaken and run for 25 minutes at 130° F. in a Launder-Ometer. The fabric is then rinsed three times with water at 75° F. and air dried in the dark at 75° F. and 65% relative humidity. Detergents used may be nonionic or anionic.

(B) *Method for Applying Brighteners to Wool and Nylon in the Presence of Acid or Glauber's Salt*

To a Launder-Ometer jar is added 98.5 cc. or 97.5 cc., of distilled water, depending on the respective choice of the following acids.

1.5 cc. of a 10% solution of 28% acetic acid
2.5 cc. of a 10% solution of Glauber's salt Then 5 cc. of 0.005% solution of brightener is added followed by a 5-gram skein or piece of nylon or wet-out wool flannel. The jar is closed and run for 25 minutes at 130° F. in a Launder-Ometer. The nylon or wool is removed, rinsed with water of 75° F. three times and air-dried in the dark at 75° F. and 65% relative humidity.

EXAMPLE 19

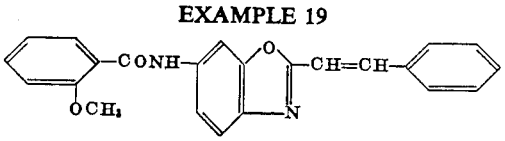

o-Anisoyl chloride is prepared by refluxing 11.26 grams of o-anisic acid with an excess of thionyl chloride, the unreacted SOCl₂ being removed under vacuum. To the residue is added 200 ml. of pyridine and then 15.9 grams of the 2-styryl-6-aminobenzoxazole of Example 13 dissolved in 300 ml. of pyridine. The mixture is heated on a steam bath until the reaction is complete (1 hr.). It is cooled and poured into an ice-water mixture. The product is isolated by filtration, washed with water and dried at 55° C. Recrystallized twice from ethanol, the M.P. is 157–158° C.

This product has excellent substantivity and fluorescence on nylon whether applied from an acid bath, an alkaline scour bath, or an anionic or nonionic detergent bath. It is also an effective brightener for cotton, resin-treated cotton and acetate. Its lightfastness is very good and it does not discolor the fiber on fading. It shows stability to hypochlorite bleaches. It also shows good compatibility and lightfastness in overprint varnishes, including nitrocellulose, butyrated cellulose and chlorinated rubber lacquers. It has good solubility in various solvents, lacquers and resins and may be added directly thereto. For this reason it is an excellent brightener for various plastics, including polyvinyl chloride, polystyrene, cellulose acetate and methyl methacrylate plastics, in which it again has excellent light fastness.

The 6-(o-ethoxybenzamido) or 2,4-dimethoxybenzamido-2-styrylbenzoxazoles are prepared by the method of Example 19. The starting materials are respectively, o-ethoxybenzoic acid and 2,4-dimethoxybenzoic acid from which the acid chlorides are prepared. The brighteners thus obtained have good affinity and fluorescence on nylon, cotton and acetate and similar fastness to hypochlorite.

EXAMPLE 20

The products of Example 19 dissolve well in lacquers and varnishes to give films of good fastness to light.

A 0.1% concentration level in butyrated cellulose varnish gives good whitening and better lightfastness in films of 1 to 2 mils than a widely used coumarin brightener, and fades without yellowing. The same effect and comparison is found in clear, rubber base lacquers.

EXAMPLE 21

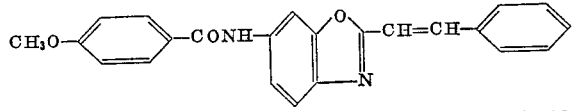

To a solution of 1.44 g. of the product of Example 13 in 30 ml. of pyridine is added 1.04 g. of p-anisoyl chloride. The mixture is warmed on a steam bath until the reaction is complete. It is then cooled and poured into an ice-water mixture. The product is taken up in hot methoxyethanol, treated with activated charcoal, filtered and water added to the filtrate. It is isolated by filtration, washed with water and dried.

When applied to the fabrics according to Method A it shows good substantivity and fluorescence, especially on nylon, and good fastness to light without discoloration. In the presence of zinc catalysts on cotton, when textile resins are applied, it shows no tendency to discolor.

EXAMPLE 22

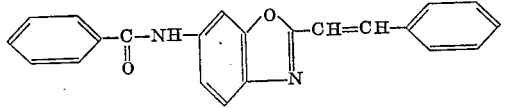

Following the procedure of Example 21 equimolar amounts of benzoyl chloride and the product of Example 13 are reacted to yield the compound 6-benzamido-2-styrylbenzoxazole. This product shows good substantivity and fluorescence on nylon.

EXAMPLE 23

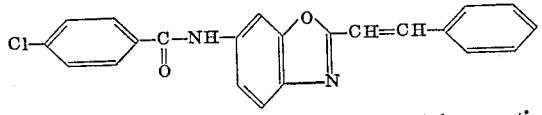

The product of this example is prepared by reacting equimolar amounts of p-chlorobenzoyl chloride and the compound of Example 13. This product shows good substantivity and fluorescence on nylon.

EXAMPLE 24

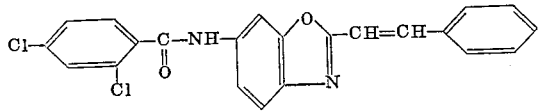

The product of this example is prepared by reacting 2,4-dichlorobenzoyl chloride and the product of Example 13 in equimolar amounts. This product shows good substantivity and fluorescence on nylon.

EXAMPLE 25

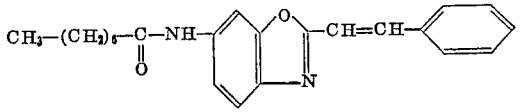

Equimolar amounts of octanoyl chloride and the compound of Example 13 are reacted in warm pyridine in accordance with the procedure of Example 21. The product, reprecipitated from hot ethanol, has excellent substantivity and fluorescence on nylon and also is an effective brightener for acetate.

6-n-octadecanoylamido-2-styrylbenzoxazole is prepared similarly, starting with n-octadecanoyl chloride as the acylating agent. The product shows blue fluorescence in ethanol and methoxyethanol solutions and brightens nylon.

EXAMPLE 26

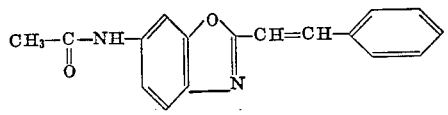

Equimolar amounts of acetyl chloride and the compound of Example 13 are reacted in warm pyridine in a manner similar to the procedure of Example 21. The product reprecipitated from hot ethanol has excellent substantivity and fluorescence on nylon and effectively brightens acetate. It brightens cotton when applied either from a detergent bath, or from a commercial laundry sour.

EXAMPLE 27

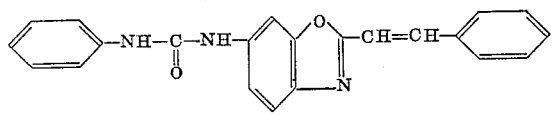

To 1.18 grams of the product of Example 13 is added 0.60 gram of phenyl isocyanate, and the mixture is heated on a steam bath until the reaction is complete. Hot methoxyethanol is added, the product is isolated by filtration and then recrystallized from methoxyethanol.

It has excellent substantivity for, and fluorescence on, nylon. It also has good affinity for, and fluorescence on, acetate and cotton.

EXAMPLE 28

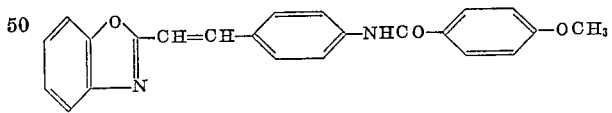

To a solution of 1.18 grams of the compound of Example 14 in 25 ml. of pyridine is added an excess of p-anisoyl chloride. The mixture is heated at reflux until the reaction is completed and then drowned in water. The product is isolated by filtration, washed with water and dried.

The product shows good substantivity for, and fluorescence on, cotton and nylon.

EXAMPLE 29

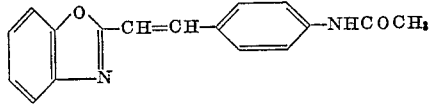

To a solution of 1.18 grams of the product of Example 14 in 25 ml. pyridine is added excess acetic anhydride. The mixture is heated at reflux until the reaction is complete (2 hrs.) and then drowned in water. The product, 2-(4-acetamidostyryl)benzoxazole, is isolated by filtration and recrystallized from methoxyethanol.

This brightener shows substantivity for, and fluorescence on, nylon and cotton. It retains fluorescence when applied in conjunction with hypochlorite.

EXAMPLE 30

[structure: benzoxazole-CH=CH-C6H4-NHCOCH2Cl]

Following the procedure of Example 28, the reaction of equimolar amounts of chloroacetyl chloride and the compound of Example 14 yields the product.

EXAMPLE 31

[structure: benzoxazole-CH=CH-C6H4-NHCOCH2CH2OC2H5]

The procedure of Example 21 is followed, using equimolar amounts of the product of Example 14 and of β-ethoxypropionyl chloride. The product shows good fluorescence on cotton and nylon.

EXAMPLE 32

[structure: benzoxazole-CH=CH-C6H4-NH-CO-naphthyl]

The procedure of Example 21 is followed, using equimolar amounts of the product of Example 14 and of β-naphthoyl chloride. The product is substantive on nylon, with good fluorescence.

EXAMPLE 33

[structure: benzoxazole-CH=CH-C6H4-NH-CO-C6H4-CH3]

The procedure of Example 21 is followed, using equimolar amounts of the product of Example 14 and of p-toluoyl chloride. The product has excellent substantivity, with fluorescence, on nylon and acetate.

EXAMPLE 34

[structure: C6H5-CONH-benzoxazole-CH=CH-C6H5]

The procedure of Example 21 is followed except that equivalent amounts of benzoyl chloride and the compound of Example 16 are used. The product, recrystallized from methoxyethanol, has affinity for, and fluorescence on, cotton and nylon.

EXAMPLE 35

[structure: HO-C6H4-C(O)-NH-benzoxazole-CH=CH-C6H5]

The procedure of Example 21 is followed using equimolar amounts of the product of Example 16 and p-acetoxybenzoyl chloride. Upon completion of the reaction the mixture is poured into a 3% aqueous caustic solution with cooling, followed by warming at 50° C. for one-half hour to complete the hydrolysis of the acetoxy group. The product is obtained on acidification and filtration, and is recrystallized from methoxyethanol. It has affinity to cotton and nylon, with fluorescence.

EXAMPLE 36

[structure: (CH3)2N-C6H4-C(O)-NH-benzoxazole-CH=CH-C6H5]

The procedure of Example 21 is followed using equimolar amounts of the product of Example 16 and of p-dimethylaminobenzoyl chloride. The product shows fluorescence on cotton and nylon.

EXAMPLE 37

[structure: CH3S-C6H4-C(O)-NH-benzoxazole-CH=CH-C6H5]

The product is obtained similarly, using p-methylmercaptobenzoyl chloride, and is substantive to cotton and nylon, with fluorescence.

EXAMPLE 38

[structure: CH3CONH-benzoxazole-CH=CH-C6H5]

Following the procedure of Example 26 except that the product of Example 16 is substituted for the product of Example 13 the above product is obtained. It has affinity for, and fluorescence on cotton, acetate, wool and nylon and good hypochlorite stability.

EXAMPLE 39

[structure: CH3SO2-C6H4-C(O)-NH-benzoxazole-CH=CH-C6H5]

The product is obtained by the procedure of Example 38 using p-methylbenzoyl chloride, and shows fluorescence on cotton and nylon.

EXAMPLE 40

[structure: CH3C(O)-NH-C6H4-C(O)-NH-benzoxazole-CH=CH-C6H5]

The product is obtained using p-nitrobenzoyl chloride followed by reduction of the nitro group with sodium hydrosulfite in alcohol and then acetylation of the amino group with acetic anhydride in pyridine. It shows good affinity to cotton and nylon, with fluorescence.

EXAMPLE 41

[structure: CH3O-C6H4-CONH-benzoxazole-CH=CH-C6H5]

To 30 ml. of pyridine is added one gram of the product of Example 16 and 0.72 gram of p-anisoyl chloride. The mixture is brought to the boil, cooled and poured into an ice-water mixture, filtered and washed. The solids are taken up in methoxyethanol, the solution filtered, cooled, and water added. The precipitate is filtered, washed with water and dried at 55° C. to yield the product. It has affinity for, and shows fluorescence on, cotton, nylon and acetate. It retains its effect when applied in conjunction with a hypochlorite bath.

EXAMPLE 42

[structure: CH3CONH-benzoxazole-CH=CH-C6H4-NHCOCH3]

A mixture of 1.5 grams of the product of Example 15 in 25 ml. of pyridine with 3 grams of acetyl chloride is heated at reflux, drowned on ice and filtered. The product has excellent substantivity for, and fluorescence on, both cotton and nylon and is good on acetate.

EXAMPLE 43

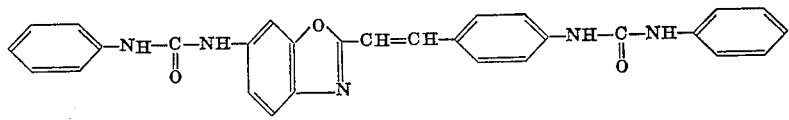

Following the procedure of Example 42 except for the use of two holes of p-sulfamoylbenzoyl chloride for the acetyl chloride used therein, the product of the above formula is obtained. It shows excellent affinity for cotton, nylon, and wool, with fluorescence.

EXAMPLE 44

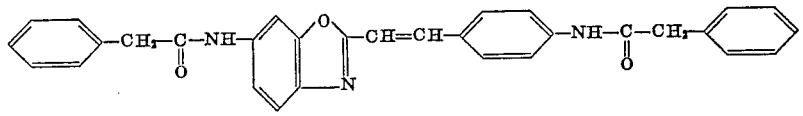

The procedure of Example 27 is followed, except that the product of Example 15, instead of 13, is used, together with two moles of phenyl isocyanate. The product of the above formula is obtained, which shows fluorescence on cotton and nylon.

EXAMPLE 45

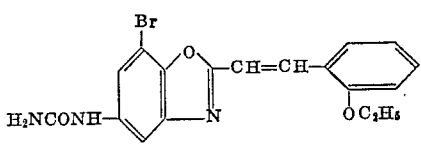

The reaction of two moles of phenylacetyl chloride and one mole of the compound of Example 15 in accordance with the procedure of Example 42 yields the product. It has good fluorescence on nylon and acetate.

EXAMPLE 46

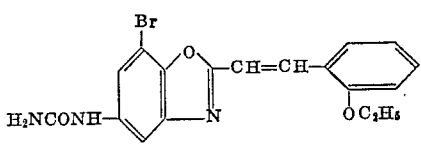

To a mixture of 3.6 grams of the product of Example 17 and 75 ml. of glacial acetic acid is added 0.89 g. of potassium cyanate portion-wise with ice-cooling. The mixture is stirred at room temperature for one hour, after which it is gradually warmed to 70° C. and stirred at that temperature for an additional hour. The product is recovered by dilution with water and filtration. It shows affinity and fluorescence when applied to nylon and acetate.

EXAMPLE 47

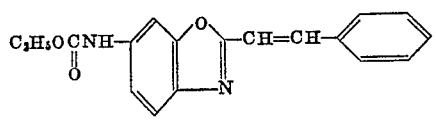

The procedure of Example 21 is followed, using an equivalent amount of ethyl chloroformate for the anisoyl chloride therein provided. The product, after recrystallization from ethanol, shows excellent brightening of nylon and acetate fibers, and good brightening of cotton.

EXAMPLE 48

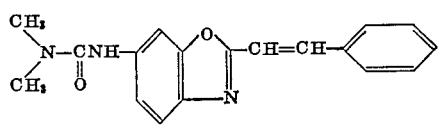

The product of Example 47 is dissolved in a minimum amount of methoxyethanol, and the solution is added slowly, with vigorous stirring, to a 40% aqueous solution of dimethylamine. After stirring at room temperature for twelve hours, the mixture is filtered for recovery of the product. The product, applied to cotton, nylon and acetate, brightens these fibers significantly.

EXAMPLE 49

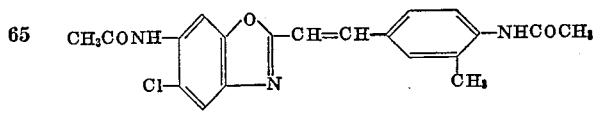

The di-acetylation procedure of Example 42 is followed, starting with the product of Example 18 instead of the product of Example 15, in equivalent amount. There is obtained the product of the above formula, which is substantive to nylon, cotton, and acetate, with fluorescent effect.

EXAMPLES 50–60

In the following table are given the structures of additional fluorescent compounds of the present invention which can be synthesized by the foregoing procedures.

TABLE

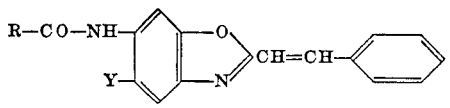

| Example No. | R | Y | M.P., °C. | λ max. (mμ) |
|---|---|---|---|---|
| 50 | phenyl-OH | H | 222–223 | 345 |
| 51 | CH₃—(CH₂)₁₀— | H | 123–125 | 340 |
| 52 | biphenyl | H | (¹) | 345 |
| 53 | diphenyl (branched) | H | 101 | 343 |
| 54 | phenyl-O—(CH₂)₁₁CH₃ | H | 96–98 | 345 |
| 55 | phenyl-OCH₂CH₂OH | H | 204–206 | 345 |
| 56 | Cl—CH₂— | H | 188–192 | 340 |
| 57 | CH₃O—phenyl— | CH₃ | 227–229 | 338 |
| 58 | phenyl-OCH₃ | CH₃ | 206–207 | 348 |
| 59 | CH₃O—phenyl— | Cl | 196–198 | 340 |
| 60 | phenyl-OCH₃ | Cl | 254–255.5 | 348 |

¹ No melting below 250°.

I claim:
1. Compounds of the formula

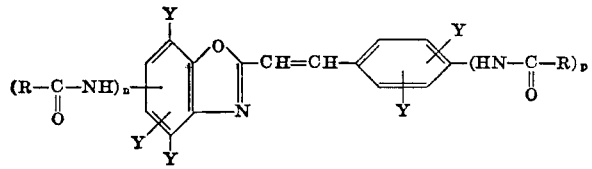

wherein each R is a member selected from the group consisting of hydrogen, alkyl of up to seventeen carbons, aryl of less than three six-membered rings, benzyl, phenethyl, alkoxy of up to eighteen carbons, amino, mono lower alkylamino, di-lower alkylamino and anilino, N-lower alkylanilino, any substituents on aryl radicals being selected from the group consisting of halo, alkyl of up to eighteen carbons, alkoxy of up to eighteen carbons, hydroxy, carboxy, cyano, di-lower alkylamino, lower alkanamido, lower alkylthio, lower alkylsulfonyl, carbamyl and sulfamyl; each Y radical is a member selected from the group consisting of hydrogen, lower alkoxy, halogen and lower alkyl; and $n$ and $p$ are integers less than two such that their sum is a positive integer less than three.

2. A compound of the formula

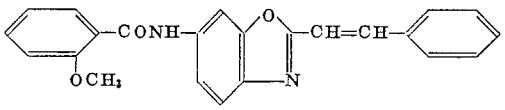

3. A compound of the formula

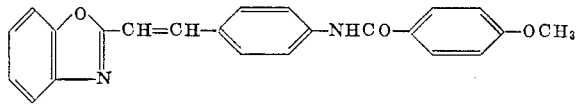

4. A compound of the formula

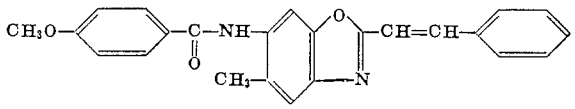

5. A compound of the formula

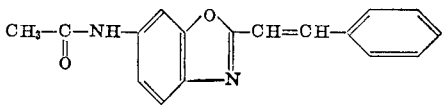

6. A compound of the formula

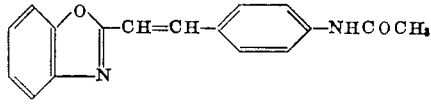

7. A compound of the formula

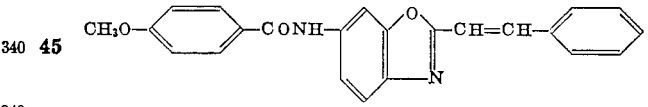

8. A compound of the formula

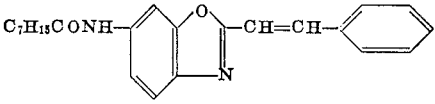

References Cited in the file of this patent
UNITED STATES PATENTS
3,120,520    Buell _____ Feb. 4, 1964
FOREIGN PATENTS
578,303     Canada _____ June 23, 1959
1,336,949   France _____ Oct. 1, 1963
OTHER REFERENCES
Postovskii et al.: Zhur. Obsch. Khim., vol. 32, pages 2617–2624 (1962).

UNITED STATES PATENT OFFICE
CERTIFICATE OF CORRECTION

Patent No. 3,158,610                        November 24, 1964

Bennett George Buell

It is hereby certified that error appears in the above numbered patent requiring correction and that the said Letters Patent should read as corrected below.

Column 3, line 61, for "2,3- 4-methoxycinnamoyl chloride" read -- 2,4-dimethylcinnamoyl chloride --; column 13, line 19, for "holes" read -- moles --.

Signed and sealed this 13th day of April 1965.

(SEAL)
Attest:

ERNEST W. SWIDER                             EDWARD J. BRENNER
Attesting Officer                                Commissioner of Patents